United States Patent
Boge et al.

(10) Patent No.: US 9,375,907 B2
(45) Date of Patent: Jun. 28, 2016

(54) PRODUCTION SYSTEM FOR PRODUCING FIBRE COMPOSITE MATERIAL COMPONENTS

(75) Inventors: Christian Boge, Mosbach (DE); Bernhard Pause, Mosbach (DE); Matthias Meyer, Buxtehude (DE); Dirk Röstermundt, Peine (DE)

(73) Assignees: Deutsches Zentrum Fur Luft—Und Raumfahrt E.V., Cologne (DE); Broetje-Automation GmbH, Wiefekstede (DE)

( * ) Notice: Subject to any disclaimer, the term of this patent is extended or adjusted under 35 U.S.C. 154(b) by 0 days.

(21) Appl. No.: 13/819,000
(22) PCT Filed: Aug. 25, 2011
(86) PCT No.: PCT/EP2011/064628
§ 371 (c)(1), (2), (4) Date: Feb. 26, 2013
(87) PCT Pub. No.: WO2012/028531
PCT Pub. Date: Mar. 8, 2012

(65) Prior Publication Data
US 2013/0153154 A1 Jun. 20, 2013

(30) Foreign Application Priority Data
Aug. 30, 2010 (DE) .......................... 10 2010 039 955

(51) Int. Cl.
*B29C 70/38* (2006.01)
*B32B 38/18* (2006.01)
(Continued)

(52) U.S. Cl.
CPC . *B32B 38/18* (2013.01); *B25J 5/02* (2013.01); *B25J 9/0084* (2013.01); *B29C 70/38* (2013.01);
(Continued)

(58) Field of Classification Search
CPC .... B29C 70/38; B29C 70/386; B29C 70/382; B25J 5/02; B25J 9/0084; B25J 5/005; B25J 5/007; B25J 9/1664; B32B 38/18
USPC .......................................... 156/557, 574, 577
See application file for complete search history.

(56) References Cited

U.S. PATENT DOCUMENTS 3,938,377 A * 2/1976 Converse et al. .......... 73/114.71
4,588,466 A 5/1986 Eaton
(Continued)

FOREIGN PATENT DOCUMENTS

DE 19537663 A1 4/1997
DE 10102758 A1 * 7/2002
(Continued)

OTHER PUBLICATIONS

Search Report and Written Opinion PCT/EP2011/064628; date of mailing Nov. 24, 2011; 10 pages.
(Continued)

*Primary Examiner* — William Bell
(74) *Attorney, Agent, or Firm* — Reising Ethington P.C.

(57) ABSTRACT

To produce a fiber composite material component, a production system has a mold providing unit with at least one component mold. Fiber composite material can be applied to the at least one component mold by means of at least two production units. The at least two production units can be moved for this purpose on a guide path. The guide path runs round the mold providing unit so that the at least two production units can travel round the mold providing unit along the guide path. The productivity and flexibility of production can thereby be increased.

15 Claims, 6 Drawing Sheets

(51) Int. Cl.
*B25J 5/02* (2006.01)
*B25J 9/00* (2006.01)
*B29L 31/30* (2006.01)

(52) U.S. Cl.
CPC ............ *B29C 70/382* (2013.01); *B29C 70/386* (2013.01); *B29L 2031/3076* (2013.01); *Y10T 156/12* (2015.01); *Y10T 156/1702* (2015.01)

(56) References Cited

U.S. PATENT DOCUMENTS

| | | | | |
|---|---|---|---|---|
| 2005/0236735 | A1* | 10/2005 | Oldani et al. | 264/257 |
| 2005/0274276 | A1* | 12/2005 | Davis et al. | 104/88.01 |
| 2007/0031217 | A1* | 2/2007 | Sharma | 414/222.08 |
| 2008/0202691 | A1* | 8/2008 | Hamlyn et al. | 156/441 |
| 2009/0095410 | A1* | 4/2009 | Oldani | 156/189 |
| 2010/0217437 | A1* | 8/2010 | Sarh et al. | 700/248 |
| 2011/0193253 | A1* | 8/2011 | Polk et al. | 264/40.7 |

FOREIGN PATENT DOCUMENTS

| | | |
|---|---|---|
| DE | 102010015027 A1 | 10/2011 |
| EP | 2505343 A1 | 10/2012 |
| WO | 03035380 A1 | 5/2003 |
| WO | 2005105641 A2 | 11/2005 |

OTHER PUBLICATIONS

Boge, C., Rostermundt, D.; "Exploring Challeges of Process Chain for CFRP Structures"; Advanced Automated Fibre Placement (AFP) Technology; Institute of Composite Structures and Adaptive Systems; 8 pages, presented at 2010 JEC Trade Fair in Paris, France. Apr. 13-Apr. 15, 2010.

* cited by examiner

PRODUCTION SYSTEM FOR PRODUCING FIBRE COMPOSITE MATERIAL COMPONENTS

CROSS-REFERENCES TO RELATED APPLICATIONS

This application claims the priority of German Patent Application, Serial No. 10 2010 039 955.8, filed Aug. 30, 2010, pursuant to 35 U.S.C. 119(a)-(d), the content of which is incorporated herein by reference in its entirety as if fully set forth herein.

FIELD OF THE INVENTION

The invention relates to a production system for producing fibre composite material components with a mould providing unit, which has at least one component mould for a fibre composite material component arranged on a mould support, and at least two production units for applying a fibre composite material to the at least one component mould, which are movably arranged on a guide path.

BACKGROUND OF THE INVENTION

A production system for producing fibre composite material components, in which linear guide paths to guide production units are arranged on both sides of a component mould is known from WO 2005/105 641 A2. Two production units are movably arranged on each of the guide paths and are used to apply fibre composite material to the component mould. The production system has a master-slave controller. The controller of one of the production units is formed as a master controller, whereas the controllers of the further production units are formed as slave controllers. The master controller defines a common time basis and, by means of the slave controllers, synchronises the movement of the machining heads of the production units. Because of the plurality of production units, the production system has high efficiency, but there is a constant need on the part of the customers to make the production of fibre composite material components even more efficient and flexible.

SUMMARY OF THE INVENTION

The invention is based on an object of developing a production system of the generic type in such a way that more efficient and flexible production of fibre composite material components is possible.

This object is achieved by a production system, in which the guide path is configured to run round the mould providing unit and the at least two production units are driveable around the mould providing unit along the guide path. Since the guide path is formed running around the mould providing unit or the component mould, the at least two production units can travel in a circular manner around the component mould along the guide path. The guide path therefore forms, for the at least two production units, a peripheral path for producing the fibre composite material component, on which path the at least two production units can be simultaneously operated in the circular mode. It is thereby ensured that the at least two production units have a uniform and constant travelling direction, so the at least two production units can be operated at a close spacing with respect to one another. Owing to the circular type of movement of the at least two production units, collisions are avoided between the production units in a simple manner. Owing to the uniform and constant travelling direction, it is, in particular, possible to operate a large number of production units in the circular mode, so the efficiency is substantially increased. The production system according to the invention—depending on the size of the fibre composite material component to be produced—allows the use of at least five, in particular at least six, and in particular at least eight production units.

Moreover, in comparison to a linear and non-peripheral guide path, the stoppage times of the production units are reduced, as a production unit, after a material application process, can directly continue with a new material application process, whereas in the case of a non-peripheral guide path, a production unit has to wait after a material application process until the next production unit has also completed its material application process and the two production units can carry out a change of travelling direction. An important efficiency advantage is also produced when a production unit has to interrupt a material application process as a result of an error. In this case, the production unit, which has interrupted the material application process, after a travelling process, can start a new material application process at the beginning of the component mould, whereby the following production unit is not hindered. The subsequent production unit can optionally continue the interrupted material application process or compensate it by a correspondingly adapted material application process. In total, a higher system availability in comparison to the prior art and therefore higher production efficiency or production productivity and higher production flexibility are therefore achieved by the production system according to the invention.

A production system, in which the guide path forms at least one rectangular peripheral path, ensures short travelling paths. As a result, the production productivity is optimised.

A production system, in which the guide path has a plurality of pivoting stations, by means of which the at least two production units are pivotable to change the direction of travel, in a simple manner, makes possible a rapid change of travelling direction of the at least two production units. The pivoting stations are part of the guide path, so a change of travelling direction is possible in such a way that a production unit is moved to the pivoting station and then pivoted by means of the pivoting station in such a way that the production unit can be further moved on the guide path with a changed direction of travel. The pivoting stations can be pivoted in particular through 90°, in particular at least through 180° and in particular through at least 360°. Moreover, the pivoting stations can preferably be pivoted in the two pivoting directions.

A production system, in which the guide path has two production path portions, which are arranged relative to the mould providing unit in such a way that the fibre composite material is applicable on two sides to the at least one component mould, the two production path portions in particular being linear, increases the production productivity and flexibility. Since the fibre composite material can be applied on two sides to the at least one component mould, a fuselage component of an aircraft, for example, can be produced more quickly with a large number of production units. Moreover, two wing components of an aircraft can be produced simultaneously, for example, with two component moulds arranged on the mould support. The material application process is simplified by the linearly formed production path portions.

A production system, in which the guide path forms a first peripheral path for producing the fibre composite material component and a maintenance path portion, which is separate from this, for maintaining the at least two production units, leads to a higher production productivity and flexibility. Owing to the separate maintenance path portion, a production unit can undergo a maintenance process and/or a setting-up process without the production units located on the first peripheral path being hindered with respect to their travelling processes. Maintenance and/or setting-up processes, which are decoupled and independent of the production of the fibre composite material component, are thereby made possible. For example, one part of the production units may be in the production process, whereas the other part of the production units is undergoing a setting-up process, so the set-up production units can directly continue with the production of the fibre composite material component if the production units in production have to interrupt the production process as a result of a lack of material.

A production system, in which the maintenance path portion is a part of a second peripheral path, increases the flexibility during maintenance and setting-up of the production units. Since the maintenance path portion is part of a peripheral path, the production units can be removed at various points of the peripheral path for producing the fibre composite material component for maintenance and setting-up purposes or returned to this peripheral path at various points. As a result, for example, a production unit can be removed from the production process for setting-up purposes and a further production unit can be fed to the production process, simultaneously.

A production system, in which a plurality of dead end-type station path portions are arranged on the maintenance path portion to form maintenance stations, increases the flexibility during the maintenance and setting-up of production units. Owing to the dead end-like station path portions, production units in a maintenance or setting-up process do not block the maintenance or setting-up of further production units. The production system, in particular, has at least three, in particular at least four, and in particular at least six maintenance stations.

A production system, in which the maintenance path portion separates an interior space from an exterior space and the station path portions are arranged in the interior space and/or the exterior space, ensures an arrangement of the maintenance stations that is in accordance with need. The station path portions arranged in the interior space optimise the space requirement of the production system, whereas the station path portions arranged in the exterior space are easily accessible. A high number of maintenance stations is then achieved, station path portions are arranged both in the interior space and in the exterior space.

A production system comprising at least five, in particular at least six, and in particular at least eight, production units, which are self-sufficiently formed and are movable independently of one another, leads to a significant increase in the production productivity. As the production units are operated in the circular mode during the production of the fibre composite material component, a comparatively large number of production units can cooperate in the production at small intervals. Moreover, in parallel with the production, an adequate number of production units can be maintained and set up, so a continuous production process with high productivity is ensured.

A production system, in which each of the production units comprises a slide, which is movable on the guide path, a positioning device, arranged on the slide, a machining tool, which is arranged on the positioning device, for applying the fibre composite material, a material store, which is arranged on the slide, for providing the fibre composite material, which store is, in particular, coolable, an energy supply device, which is arranged on the slide and is configured in such a way that the production unit is freely movable along the entire guide path, and a control device, which is arranged on the slide, has completely self-sufficient production units. The energy supply device is, in particular, formed in such a way that the respective production unit can be freely moved along the entire guide path. For this purpose, the energy supply device may, for example, have a battery or sliding contacts also guided on the slide, to transmit energy. In particular, the production units have, however, no line-bound energy transmission, such as, for example, energy chains, so free movement of the production units is ensured.

A production system, in which the energy supply device has a first sliding contact, which, to transmit electrical energy, is in contact with a second sliding contact arranged on the guide path, ensures free movement of the respective production unit. The first sliding contact is, for example, arranged on the slide and is in contact with an associated second sliding contact, which is arranged on the guide path. An energy supply to the respective production unit takes place by means of the sliding contacts, the freedom of movement not being hindered. In particular, the pivotable portions of the pivoting stations also have sliding contacts for the energy supply of the respective production unit on the pivoting station.

A production system, in which the positioning device is configured as a robot and has at least four, in particular at least five and, in particular, at least six pivoting axes for the machining tool, ensures high flexibility in the production of fibre composite material components. Owing to the large number of pivoting axes, a flexible positioning of the machining tool relative to the component mould is possible. Fibre placing heads, which can apply so-called prepregs, in other words web-like fibre composite material, to the component mould, are used as the machining tool.

A production system, in which at least one of the production units has a plurality of machining tools, it being possible to replaceably fasten each of the machining tools on the positioning device, increases the production productivity and flexibility. Owing to the machining tools, which can be replaceably fastened to the positioning device, a large number of production steps can be carried out using the production system. After the application of the fibre composite material, a quality check of the fibre composite material placed or the laminate placed can take place by means of a special machining tool or a special end effector. After a separate hardening process of the laminate, a mechanical machining is possible. A drilling or milling machining can be carried out, for example, after the hardening of the fibre composite material.

A production system, in which the control device is configured in such a way that data are wirelessly transmittable to the latter by a master control device, allows the exchange of NC control programs between the master control device and the control devices of the production units in a simple manner. The data transmission or the transmission of the NC control programs takes place by means of WLAN. For this purpose, the WLAN, for example, has a plurality of so-called access points, in other words connection regions in which a data transmission can take place.

A production system, in which the control device is configured in such a way that the latter controls the movement of the production unit independently of a master control unit, ensures high flexibility and safety. The respective production unit is controlled locally by means of its control device, so no laborious data transmission between the master control device and the individual control devices of the production units is necessary. The master control device and the control devices of the production units, in particular, have no common time basis in the sense of a computer cycle synchronisation and no common time cycle. The same applies to the control devices of the production units between one another. Collisions between the individual production units are avoided, for example, by means of spacer sensors which are arranged at the production units and locally monitor the movement of the respective production unit in conjunction with the associated control device. Furthermore, the production system may have a position monitoring system to avoid collisions, said position monitoring system being configured, for example, as a so-called indoor GPS system. Where there are position deviations between a desired position predetermined in the NC control program and the actual position determined, the movement of the respective production unit can be adapted. In the production process of a fibre composite material component, the master control device does not have to guide and control the production units because of the local control. The master control device may, however, in an emergency be used to implement an emergency shutdown. Before the actual production of a fibre composite material component, the NC control programs are transmitted by means of the master control device to the respective production units or the associated control devices.

BRIEF DESCRIPTION OF THE DRAWING

Further features, advantages and details of the invention emerge from the following description of an embodiment.

DESCRIPTION OF THE PREFERRED EMBODIMENT

Figure 1:
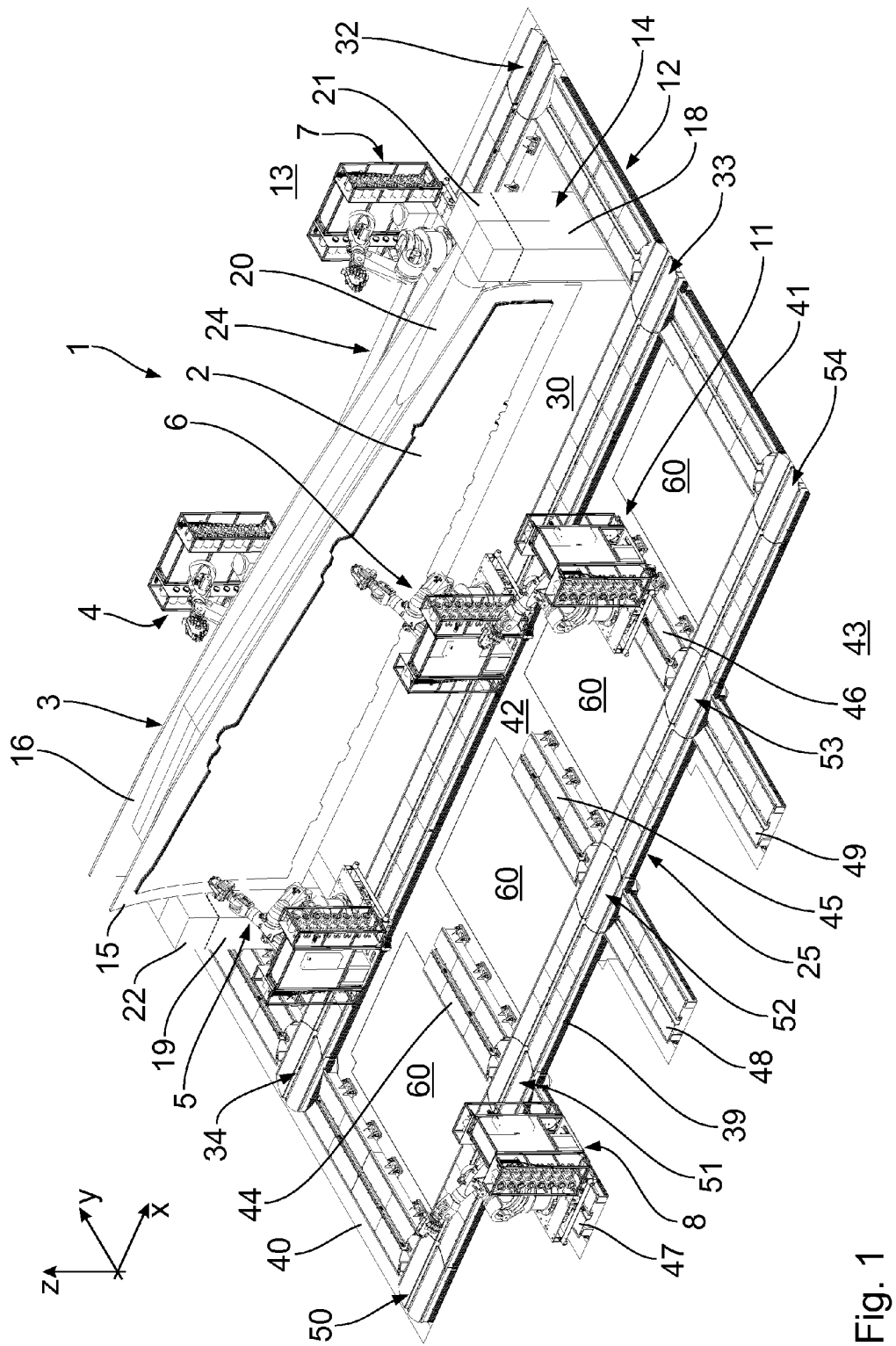
FIG. 1 shows a perspective view of a production system for producing a fibre composite material component with a plurality of production units, which can be moved on a guide path.

A production system 1, to produce two fibre composite material components 2, has a mould providing unit 3, and eight associated production units 4 to 11. The production units 4 to 11 are movably arranged on a guide path 12. The mould providing unit 3 and the guide path 12 are fastened to a baseplate 13. For reasons of clarity, only six of the eight production units 4 to 11 are shown in FIG. 1.

The mould providing unit 3 has a mould support 14, on which two component moulds 15, 16 for two aircraft wings are arranged. The aircraft wings are produced from a web-like fibre composite material 17 and therefore form the fibre composite material components 2. The mould support 14 comprises two supports 18, 19, which are spaced apart in a horizontal x-direction and between which a shaft 20 is rotatably mounted. The shaft 20 can be rotatably driven by means of two drive motors 21, 22 about a horizontal rotary axis 23 extending parallel to the x-direction. The component moulds 15, 16 are fastened to the shaft 20 on opposing sides.

The production units 4 to 11 are used to apply the fibre composite material 17 to the component moulds 15, 16. For this purpose, the production units 4 to 11 can be moved independently of one another on the guide path 12. The guide path 12 substantially has the shape of an eight and forms two peripheral paths 24, 25. A first peripheral path 24 is called a process peripheral path below, whereas a second peripheral path 25 is called a maintenance peripheral path below. The process peripheral path 24 is rectangular and has two production path portions 26, 27 running in the x-direction and two connection path portions 28, 29 running perpendicular thereto in a y-direction. The path portions 26 to 29 are, in each case, linear and limit a machining space 30, in which the mould providing unit 3 is arranged. The guide path 12 is therefore formed running round the mould providing unit 3, so the production units 4 to 11 can travel in a circular manner round the mould providing unit 3 along the process peripheral path 24. To change the travel direction or to move the production units 4 to 11 to the respective next path portion 26 to 29, pivoting stations 31 to 34 are arranged on the respective corners of the process peripheral path 24. The pivoting stations 31 to 34 in each case have associated pivoting axes 35 to 38, which extend parallel to a vertical z-direction. The x-, y- and z-direction form a Cartesian coordinate system.

The production path portions 26, 27 are arranged opposing one another and associated in each case with one of the component moulds 15, 16. The production path portion 27 is, for example, arranged with respect to the component mould 15 in such a way that fibre composite material 17 can be applied by means of the production units 4 to 11 to the component mould 15 if the latter move along the production path portion 27. The same applies to the production path portion 26 and the associated component mould 16.

The maintenance peripheral path 25 is used for maintaining or setting up the production units 4 to 11. The maintenance peripheral path 25 is rectangular and comprises the production path portion 27 and a maintenance path portion 39, which is arranged parallel thereto and runs in the x-direction, which are connected to one another by two connection path portions 40, 41 running in the y-direction. The path portions 39 to 41 are also linear. The path portions 27 and 39 to 41 delimit a maintenance interior space and separate the latter from a maintenance exterior space 43.

Three dead-end-like station path portions 44 to 46 and 47 to 49 in each case extend in the maintenance interior space 42 and the maintenance exterior space 43, proceeding from the maintenance path portion 39. The station path portions 44 to 46 and 47 to 49 are uniformly spaced apart from one another in the x-direction, so the station path portions 44 to 49 located in the maintenance interior space 42 and those located in the maintenance exterior space 43 oppose one another pair-wise. To change the travelling direction of the production units 4 to 11, arranged between the connection path portions 40 or 41 and the maintenance path portion 39 and between the maintenance path portion 39 and the station path portions 44 to 49 are five further pivoting stations 50 to 54, which form associated pivoting axes 55 to 59 running parallel to the z-direction. A plurality of maintenance stations 60 are formed adjacent to the station path portions 44 to 49 to maintain and/or set-up the production units 4 to 11.

The guide path 12 has a support frame 61, which is connected to the baseplate 13. Two lateral guide rails 62 to 63, on which the production units 4 to 11 are guided, are arranged on the support frame 61. In addition, the guide path 12 has a central guide groove 64, in which the production units 4 to 11 are also guided. A toothed strip 73 is arranged laterally in the guide groove 64 to move the production units 4 to 11 on the guide path 12.

Arranged laterally on the support frame 61 are sliding contacts 65, which, for energy transmission to the production units 4 to 11, are connected to a central energy supply 66.

The pivoting stations 31 to 34 and 50 to 54 are structurally the same, so only the pivoting station 31 is described below. The pivoting station 31 forms a pivoting path portion 67 of the guide path 12, which can be pivoted about the pivot axis 35 by means of a drive motor 68. The pivoting path portion 67 is, in principle, formed like the remaining guide path 12, but two pivoting parts 69, 70, which can be pivoted relative to one another, are additionally arranged between the support frame 61 and the baseplate 13. Arranged on the plate-like first pivoting part 69 are the support frame 61 and the drive motor 68, whereas the second pivoting part 70 is fastened to the baseplate 13. The second pivoting part 70, at the end facing the first pivoting part 69, has a ring gear 71, in which a toothed wheel 72, which can be rotatably driven by means of the drive motor 68, engages. The toothed wheel 72 can be rotatably driven by means of the drive motor 68 in two directions of rotation, so the pivoting path portion 67 can be pivoted in two pivoting directions. The pivoting path portion 67 can be pivoted in the two pivoting directions through 90°.

The production units 4 to 11 are configured self-sufficiently and can be moved independently of one another. The production units 4 to 11 are structurally the same, so only the production unit 4 is described below. The production unit 4 has a slide 74, which is mounted and guided on the guide rails 62, 63 and in the guide groove 64. Two drive motors 75, which rotatably drive a toothed wheel 77 by means of an angular gear 76, are fastened to a lower side of the slide 74. The respective toothed wheel 77 engages with the toothed strip 73, so the production unit 4 can be linearly moved on the guide path 12. The upper side of the slide 74 is used as a platform for a positioning device 78, two coolable material stores 79, 80, a cooling device 81, an energy supply device 82 and a control device 83. The drive motors 75 can be activated by means of the control device 83 in such a way that a prestressing and therefore a play-free drive system is produced between the toothed wheels 77 and the toothed strip 73, so a high degree of positioning accuracy can be achieved.

Figure 6:
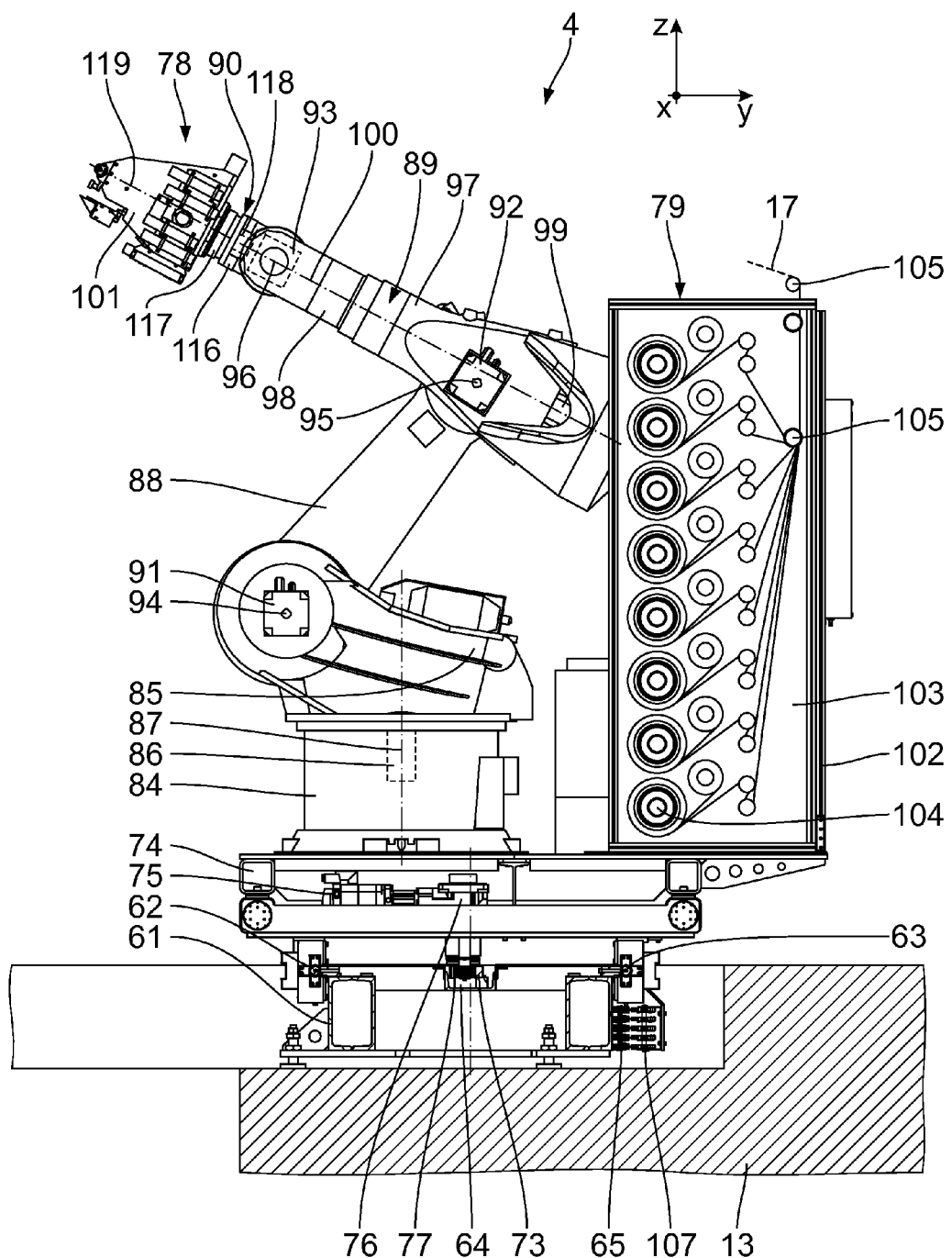
FIG. 6 shows a partially sectional side view of the production unit in FIG. 5.

The positioning device 78 is configured as a robot or industrial robot and is rigidly arranged on the slide 74 with a base frame 84. A pivoting part 85, called a carousel, which can be pivoted by means of a drive motor 86 about a vertical pivoting axis 87 extending parallel to the z-direction, is arranged on the base frame 84. Three pivoting arms 88, 89, 90, which are connected to one another at the end and can be pivoted by means of respective drive motors 91, 92, 93 about associated, horizontally extending pivoting axes 94, 95, 96, are arranged on the pivoting part 85. The pivoting arm 89 has a two-part configuration and has two pivoting parts 97, 98, which can be pivoted relative to one another about their central centre longitudinal axis 100 by means of a drive motor 99. The centre longitudinal axis 100 of the pivoting parts 97, 98 therefore forms a further pivoting axis. Accordingly, the pivoting arm 90 has a two-part configuration and has two pivoting parts 116, 117, which can be pivoted relative to one another by means of a drive motor 118 about a centre longitudinal axis 119. The centre longitudinal axis 100 and the centre longitudinal axis 119 coincide in FIG. 6. The centre longitudinal axis 119 of the pivoting parts 116, 117 therefore forms a further pivoting axis. A machining tool 101 formed as a fibre placing head is arranged at the end on the pivoting arm 90. The machining tool 101 can therefore be pivoted about six pivoting axes 87, 94, 95, 96, 100 and 119. As the positioning device 78 can be moved along the guide path 12, the latter additionally provides a linear axis for the positioning device 78.

The machining tool or the end effector 101 is used to apply the fibre composite material 17 to the component moulds 15, 16. The material stores 79, 80 arranged on the slide 74 are used to provide the fibre composite material 17. The material stores 79, 80 are structurally the same, so only the material store 79 is described below. The material store 79 has a housing 102, the interior space 103 of which can be cooled by means of the cooling device 81. A plurality of material rolls 104 with the web-like fibre composite material 17 is rotatably mounted in the interior space 103. The fibre composite material 17 is, in each case, guided over a plurality of deflection pulleys 105 from the material store 79 and guided to the machining tool 101. The fibre composite material 17 can be removed from the material store 79 by means of the machining tool 101 by exerting a tensile force. The cooling device 81, to cool the two material stores 79, 80, is arranged between them.

A switching cabinet 106, in which the energy supply device 82 and the control device 83 are arranged, is arranged above the cooling device 81 and between the material stores 79, 80. The energy supply device 82 is configured in such a way that the production unit 4 can be freely moved along the entire guide path 12. For this purpose, the energy supply device 82 has sliding contacts 107, which, arranged on the slide 74, are in contact with the sliding contacts 65. By means of the sliding contacts 65, 107, electrical energy can be transmitted by the central energy supply 66 to the energy supply device 82. The energy supply device 82, by means of a suitable circuit, supplies all the loads arranged on the slide 74, in particular the drive motors 75, 86, 91, 92, 93, 99, 118, the cooling device 81 and the control device 83 with electrical energy.

The machining tool 101 is replaceably fastened to the pivoting arm 90, so the latter can be replaced by another machining tool or another end effector 108. The machining tool or the end effector 108 lies ready, for example at one of the maintenance stations 60 and is used for a mechanical machining step of the fibre composite material 2. The machining tool 108, for example, makes drilling or milling machining possible.

The production system 1 has a master control device 109, which has a signal connection by means of a wireless network, in other words WLAN, to the control devices 83 of the production units 4 to 11 to transmit data. Because of the size of the production system 1, the master control device 109 has a plurality of connection points 110 for this purpose, which are also called access points. The master control device 109 is used to transmit NC control programs for the production units 4 to 11. The production system 1 can therefore be configured centrally, so a rapid conversion of the production is possible. The production units 4 to 11 are controlled locally by means of the respective control device 83. The control devices 83 are therefore configured in such a way that they control the movement of the production units 4 to 11 independently of the master control device 109.

Figure 2:
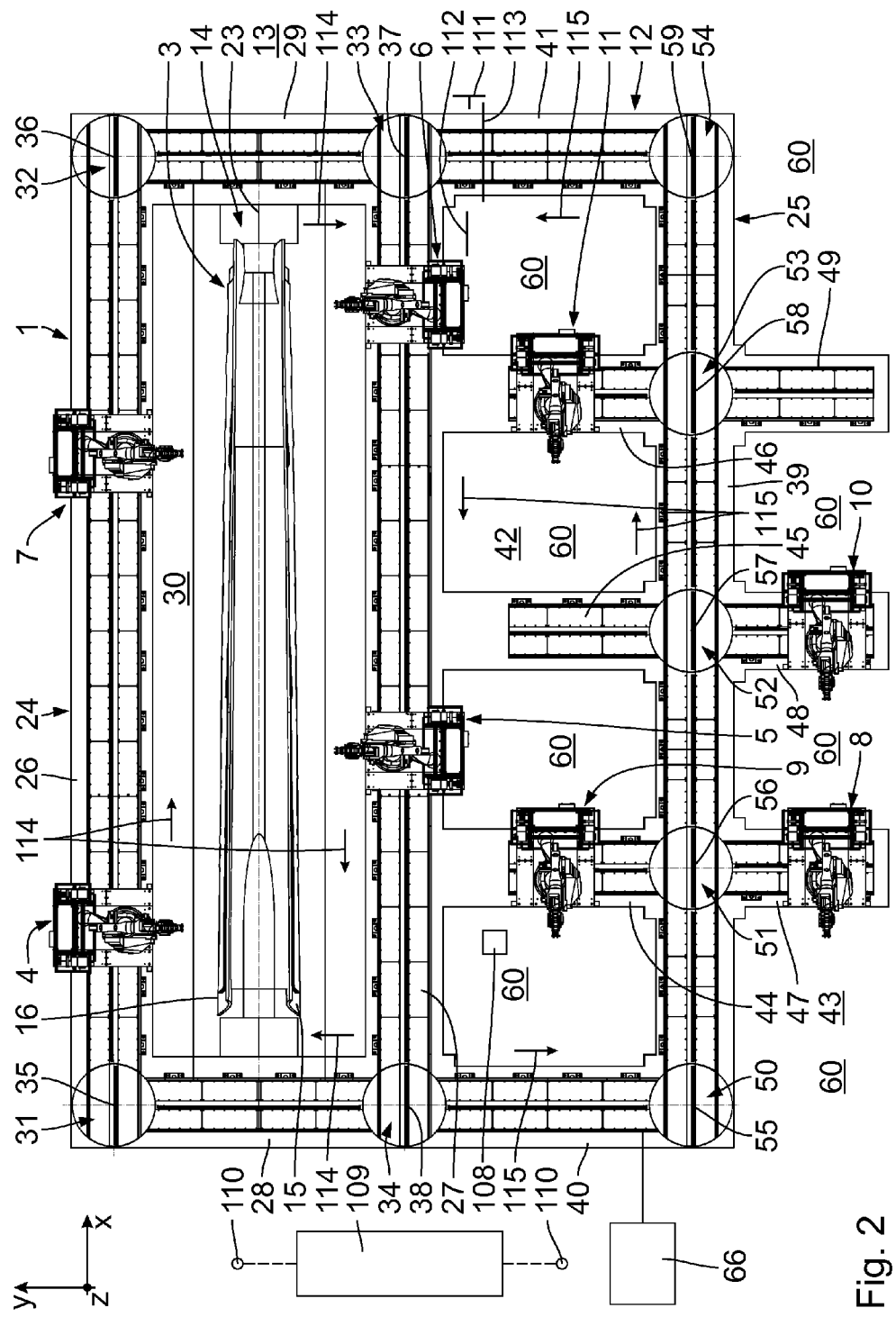
FIG. 2 shows a plan view of the production system in FIG. 1.
Figure 3:
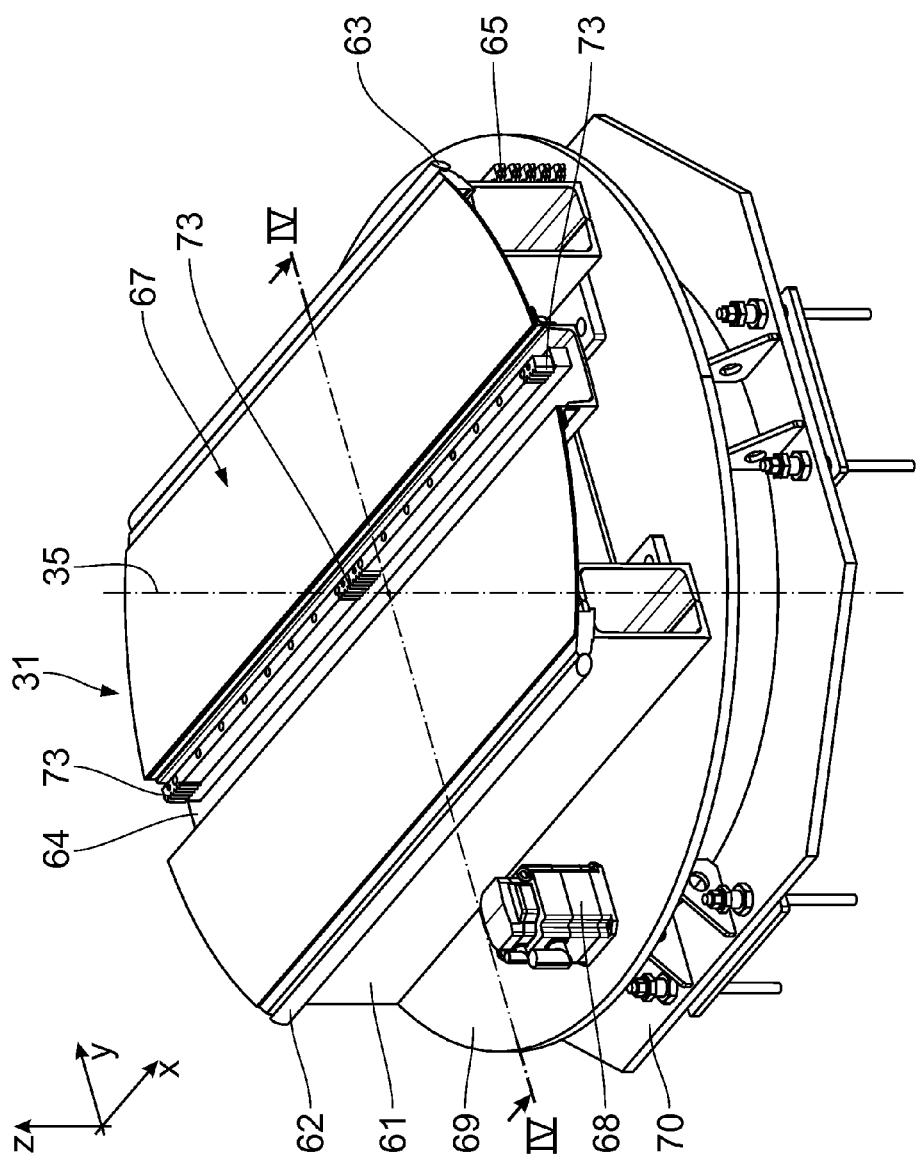
FIG. 3 shows a perspective view of a pivoting station of the guide path in FIG. 1.
Figure 4:
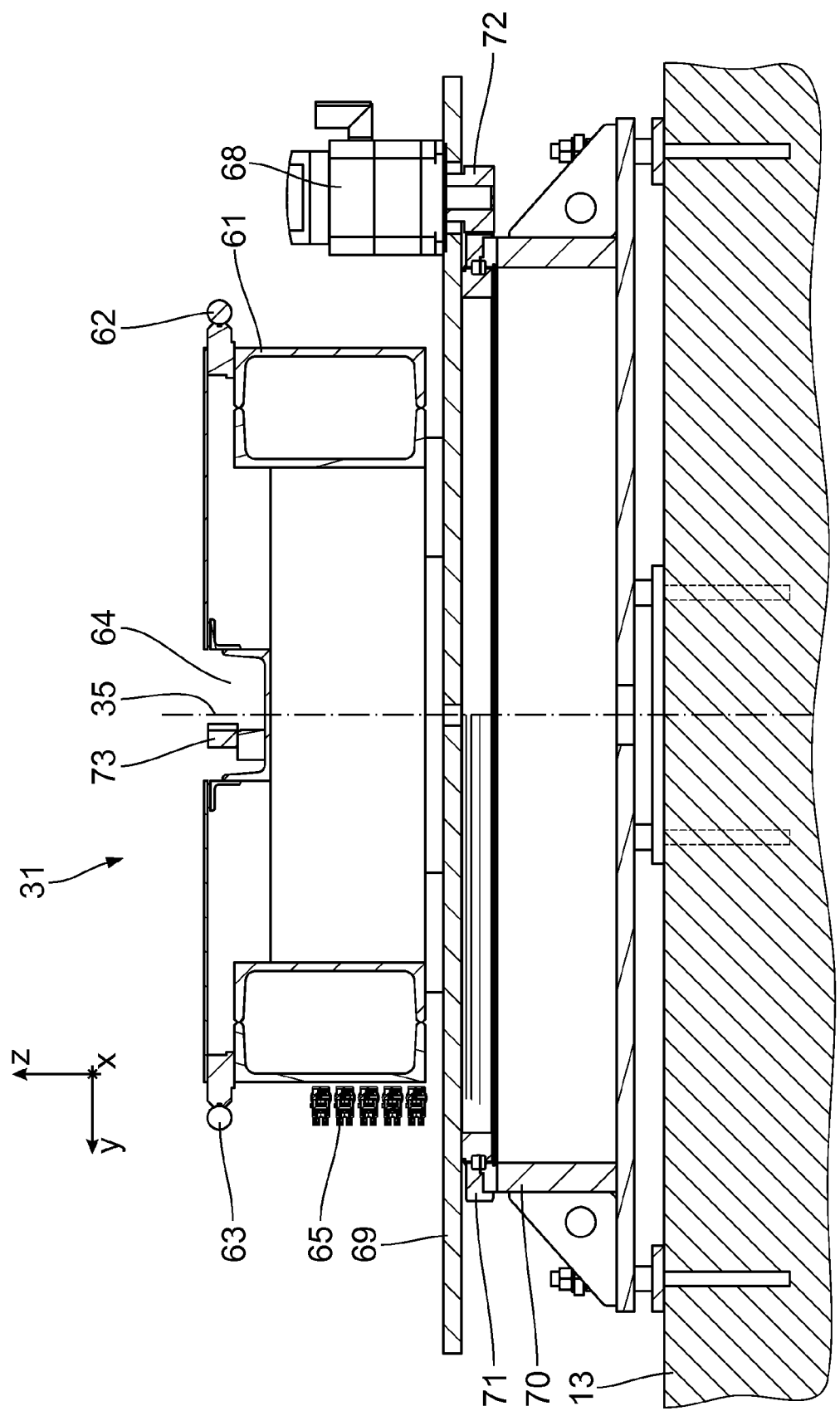
FIG. 4 shows an axial section through the pivoting station in FIG. 3.
Figure 5:
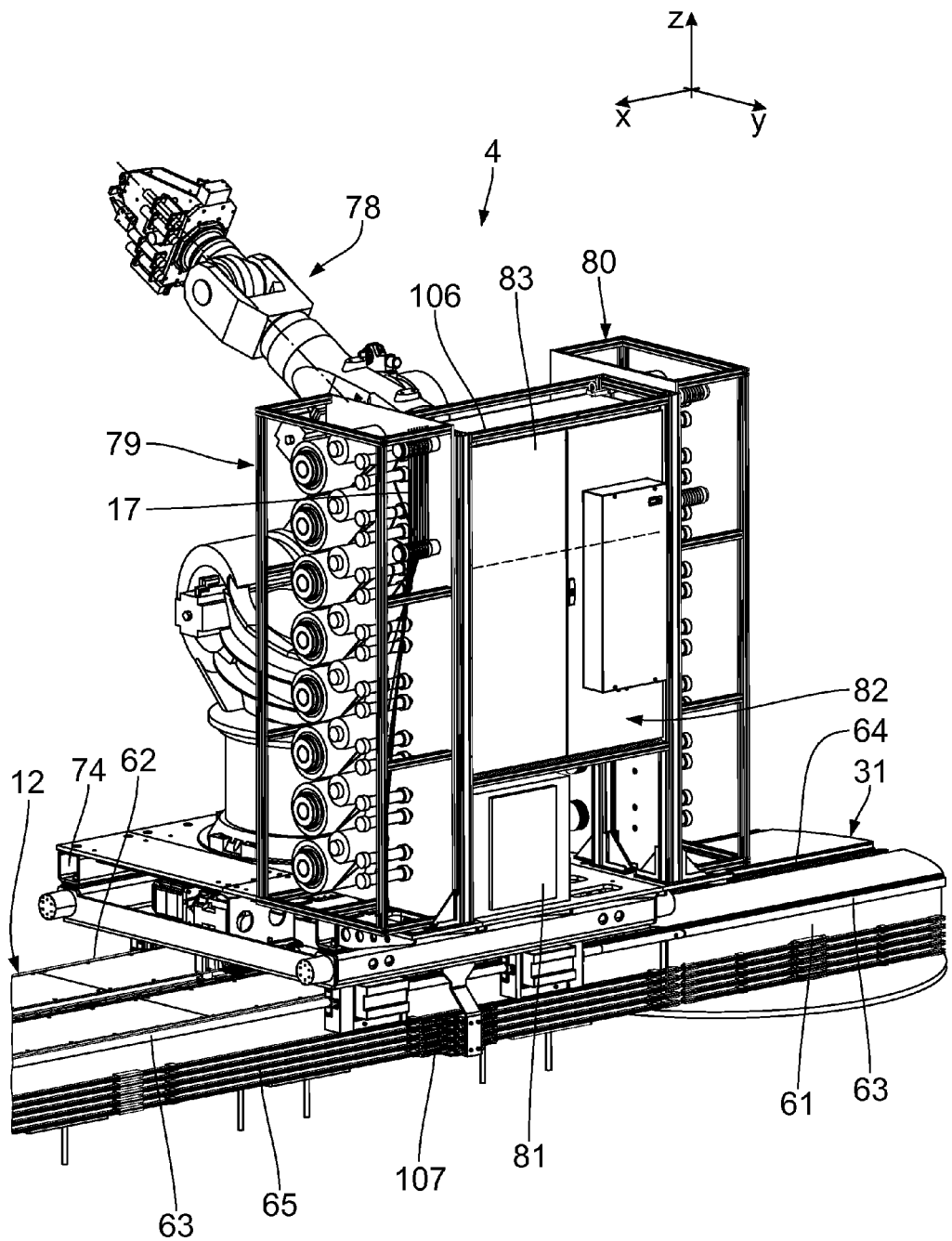
FIG. 5 shows a perspective view of a production unit in FIG. 1.

The production system 1 has a protective fence 111, which peripherally surrounds the entire production system 1. A protective fence 112 is also arranged between the production path portion 27 and the maintenance stations 60 and, in the region of the connection path portions 40, 41, has doors 113 that can be actuated by means of a respective light barrier. The protective fences 111, 112 are only indicated in FIG. 2.

To produce the two fibre composite material components 2, the production units 4 to 7 are operated in the circular mode on the process peripheral path 24 and moved around the component moulds 15, 16 in the travelling direction 114. The change of travelling direction between the production path portions 26, 27 and the connection path portions 28, 29 located in between takes place by means of the respective pivoting station 31 to 34. If the production units 4 to 7 are located on the production path portions 26, 27, fibre composite material 17 is applied to the respective component mould 15, 16. The further production units 8 to 11 are located on the station path portions 44, 46, 47, 48 and are maintained and/or set up at the associated maintenance stations 60.

As soon as one of the production units 4 to 7 has a technical problem, or has to interrupt the production process as a result of a lack of material, one of the production units 8 to 11, which can continue the production process, is directly ready. If, for example, the production unit 5 has to interrupt the production process, the latter is able to be fed to the station path portion 45 by means of the pivoting stations 34, 50 and 52. At the same time, the production unit 11 can, for example, be integrated into the process peripheral path 24 by means of the pivoting stations 53, 54 and 33, so it can continue with the production process. If, in contrast, the production unit 7 has to interrupt the production process as a result of lack of material, the latter can already be removed by means of the pivoting station 33 out of the process peripheral path 24 and fed to the station path portion 49 by means of the pivoting stations 54, 53. At the same time, for example, the production unit 8 can be fed by means of the pivoting stations 51, 50 and 34 to the process peripheral path 24, so that it can continue with the production process. The pivoting stations 33 and 34 are therefore deflectors which either leave the production units 4 to 11 in the process peripheral path 24 or transfer them into the maintenance peripheral path 25. At the same time, the pivoting stations 33, 34 are used to integrate maintained or set-up production units 4 to 11 back into the process peripheral path 24. The production units 4 to 11 are preferably operated in such a way that they are removed from the process peripheral path 24 by means of the pivoting station 34 and are integrated by means of the pivoting station 33 into the process peripheral path 24. The production units 4 to 11 therefore have a uniform direction of travel 115 in the maintenance peripheral path 25.

The production units 4 to 11 are controlled and moved locally by means of the respective control device 83. The control devices 83 of the production units 4 to 11 therefore do not have a common time basis either with one another or with the master control device 109. The master control device 109 is used for the rapid configuration of the control devices 83 during a change of component.

Safety monitoring to avoid collisions between the production units 4 to 11 takes place, for example, by means of spacer sensors at the production units 4 to 11 or by means of a position monitoring system, which is configured, for example, as an indoor GPS system and monitors the positions of the production units 4 to 11. The position monitoring system may, for example, have a signal connection with the production units 4 to 11 and/or with the master control device 109, so that individual production units 4 to 11 can be stopped to avoid collisions or overall an emergency shutdown signal can be produced for all the production units 4 to 11. Furthermore, the individual control devices 83 of the production units 4 to 11 can communicate with one another by means of WLAN, so that collisions can be avoided by a local communication between the production units 4 to 11.

The production system 1, in comparison to known production systems, has substantially higher production productivity and flexibility. Because of the configuration of the guide path 12, which forms two peripheral paths 24, 25, a large number of travelling possibilities is provided, so there is a high degree of flexibility during the production process and during the maintenance and setting up of the production units 4 to 11. This applies, in particular, when one of the production units 4 to 11 briefly and unexpectedly has to interrupt the production process because of a technical problem.

What is claimed is:

1. A production system for producing fibre composite material components, the production system comprising:
   a mould providing unit, having at least one component mould for a fibre composite material component arranged on a mould support;
   at least two production units movably arranged on a guide path for applying a fibre composite material to the at least one component mould, said guide path being configured to run around the mould providing unit; and,
   the at least two production units being driveable around the mould providing unit along the guide path, wherein the guide path comprises a first peripheral path for producing the fibre composite material component and a second peripheral path comprising a maintenance path portion which is separate from the first peripheral path for maintaining the at least two production units, wherein the maintenance path portion separates an interior maintenance space from an exterior maintenance space, and wherein a plurality of dead end-type station path portions are arranged on the maintenance path portion to form maintenance stations; and,
   said dead end station path portions extending into the interior maintenance space.

2. A production system according to claim 1, wherein the guide path forms at least one rectangular peripheral path.

3. A production system according to claim 1, wherein the guide path has a plurality of pivoting stations in right angle corners thereof, and wherein the at least two production units are pivotable to change the direction of travel.

4. A production system according to claim 1, wherein the guide path has two production path portions, whereby the two production path portions are arranged relative to the mould providing unit in such a way that the fibre composite material is applicable on two sides to the at least one component mould.

5. A production system according to claim 4, wherein the two production path portions are linear.

6. A production system according to claim 1, comprising at least five production units, wherein the at least five production units are self-sufficiently formed and are movable independently of one another.

7. A production system according to claim 1, wherein each of the production units comprises:
   a slide, movable on the guide path;
   a positioning device arranged on the slide;
   a machining tool arranged on the positioning device for applying the fibre composite material;
   a material store arranged on the slide for providing the fibre composite material;
   an energy supply device arranged on the slide and configured in such a way that the production unit is freely movable along the entire guide path; and,
   a control device arranged on the slide.

8. A production system according to claim 7 wherein the material store is coolable.

9. A production system according to claim 7 wherein the energy supply device has a first sliding contact in contact with a second sliding contact arranged on the guide path to transmit electrical energy.

10. A production system according to claim 7, wherein the positioning device is configured as a robot and has at least four pivoting axes for the machining tool.

11. A production system according to claim 7, wherein the positioning device is configured as a robot and has at least five pivoting axes for the machining tool.

12. A production system according to claim 7, wherein the positioning device is configured as a robot and has at least six pivoting axes for the machining tool.

13. A production system according to claim 7, wherein at least one of the production units has a plurality of machining tools, and wherein each of the machining tools is replaceably fastened on the positioning device.

14. A production system according to claim 7, wherein the control device is configured in such a way that data is wirelessly transmittable to the control device by a master control device.

15. A production system according to claim 7, wherein the control device is configured in such a way that the control device controls the movement of the production unit independently of a master control unit.

* * * * *